US007382767B2

(12) United States Patent
Stumer

(10) Patent No.: US 7,382,767 B2
(45) Date of Patent: Jun. 3, 2008

(54) TRANSPARENT INTERCHANGEABLE NETWORK (TIN)

(75) Inventor: Peggy M. Stumer, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 1345 days.

(21) Appl. No.: 09/965,457

(22) Filed: Sep. 27, 2001

(65) Prior Publication Data

US 2003/0091024 A1    May 15, 2003

(51) Int. Cl.
*H04L 12/66* (2006.01)
(52) U.S. Cl. ..................................... 370/352
(58) Field of Classification Search ............... 370/217, 370/218, 221, 222, 352–356, 392, 399, 395.2, 370/395.21, 395.31, 395.32, 400, 401
See application file for complete search history.

(56) References Cited

U.S. PATENT DOCUMENTS

| 5,995,607 | A | | 11/1999 | Beyda et al. ............... 379/202 |
| 6,154,445 | A | * | 11/2000 | Farris et al. ................ 370/237 |
| 6,282,192 | B1 | * | 8/2001 | Murphy et al. ............. 370/352 |
| 6,324,280 | B2 | * | 11/2001 | Dunn et al. ................. 379/230 |
| 6,389,005 | B1 | * | 5/2002 | Cruickshank ............... 370/352 |
| 6,452,922 | B1 | * | 9/2002 | Ho ............................. 370/352 |
| 6,463,053 | B1 | * | 10/2002 | Chen .......................... 370/352 |
| 6,546,003 | B1 | * | 4/2003 | Farris ......................... 370/352 |
| 6,556,565 | B1 | * | 4/2003 | Ward et al. ................. 370/356 |
| 6,643,253 | B1 | * | 11/2003 | Smith ......................... 370/217 |
| 6,781,983 | B1 | * | 8/2004 | Armistead .................. 370/353 |
| 6,785,229 | B1 | * | 8/2004 | McNiff et al. .............. 370/230 |

FOREIGN PATENT DOCUMENTS

| EP | 0 907 280 A2 | 7/1999 |
| EP | 0 907 280 A3 | 7/2002 |

* cited by examiner

*Primary Examiner*—Dmitry Levitan

(57) ABSTRACT

Voice over Internet Protocol (VoIP) private network call rerouting or switching, substantially transparent to both the caller and the called party. IP private network calls (e.g., VoIP private network) are automatically switched over a Public Services Telephone Network (PSTN) such as an Integrated Services Digital Network (ISDN) as the need arises. Alternate routing may occur because of, for example, network congestion, network outages, or detected poor Quality of Service (QoS) in the private network. Routing is over existing customer PSTN trunks and a dedicated Direct Inward Dial (DID) number, unlisted, that serves all users at a distributed system. Calls that may be switched to the PSTN (ISDN) are correlated with call associated information, such as a private calling user number, name, classmarks, Dialed Number Identification Services (DNIS), user group. VoIP calls made between users appear as intranetwork calls regardless of whether they are intranetwork calls or alternately routed.

16 Claims, 5 Drawing Sheets

TRANSPARENT INTERCHANGEABLE NETWORK (TIN)

BACKGROUND OF THE INVENTION

1. Field of the Invention

This invention relates to Voice over Internet Protocol (VoIP) calls and more particularly to rerouting VoIP calls when quality of service degrades on an IP private network.

2. Brief Description of the Prior Art

Direct Inward Dialing (DID) is a service offered by telephone companies wherein customers pay for a single DID number (or block of numbers) and callers dial directly to an extension(s) on a Private Branch Exchange (PBX) or via a gateway, packet voice system, such as an IP private network. An ISDN DID trunk forwards the entire incoming called phone number (or a subset of the number) to the PBX or router/gateway. For example, a company may have assigned phones extensions 555-7000 to 555-7999. With a caller dialing 555-7234, the DID trunk might forward 234 to the PBX or, via gateway, packet voice system. The PBX or packet voice system rings extension 234 transparent to the caller.

In what is known as a Voice Over Internet Protocol (VoIP) call, an input audio stream (analog or digital) is quantized into digital packets. These digital packets are converted via a gateway to an Internet Protocol (IP) network and routed to a destination. Upon receipt of the VoIP packets, the destination decodes the digital packets, converting them back into a continuous digital audio output stream that is nearly identical to the input audio stream. The IP network may be a public network or a private network, e.g., behind a DID public access trunk. An IP private network is a network, wherein users communicate across a secure private Internet Protocol (IP) backbone, utilizing Asynchronous Transfer Mode (ATM) and/or frame relay connections, for example, to build IP-based intranets and extranets. It is highly scalable and reliable and may support Web based applications and content hosting.

The Quality of Service (QoS) of VoIP calls can degrade due to network congestion or network processing node failure. Degraded QoS can include anything from unintelligible calls to reduced ability and unresponsiveness of the IP private network in establishing new VoIP calls. Normally, VoIP survivability (i.e., network fallback) can only be initiated in the network layer (layer 3) of the International Organization for Standardization (ISO) standard model. This is true for most public and private networks, whether a local area network (LAN), a wide area network (WAN), or a Public Services Telephone Network (PSTN) e.g., Primary Rate Interface or PRI. When such an IP network is congested or breaks, whether communicating over a LAN or using ATM, network outages occur. Communications are lost during these outages unless calls are routed over another, alternate network e.g., PSTN.

Although, IP private network reliability may exceed IP public network reliability, VoIP still is not in the same class as a traditional switched PSTN. Consequently, it frequently may be necessary to place calls intended as VoIP calls back out on a traditional circuit switched network, especially when QoS is severely degraded. However, Integrated Services Digital Network (ISDN) or Basic Rate Interface (BRI) public protocols do not provide a mechanism in layer 3 to facilitate survivability or to correlate a hairpinned call (e.g., from/to another network) routed over the public network. Further, analog and non-ISDN digital PSTN trunks do not provide layer 3 services at all.

Normally, once a VoIP call is active, there is no way to then reroute the call through a PSTN and then synchronize the voice call with the VoIP call, especially for calls made behind a DID trunk and over a IP private network. Thus, if QoS of the IP private network degrades during a VoIP call, the quality of the remainder of that VoIP call will be degraded. By contrast, if a problem is detected before a new VoIP call is established, the entire call may be alternately routed over the PSTN network. However, even if communication over the IP private network improves to an acceptable quality level, the remainder of that call continues over the PSTN.

Hairpinning is even more difficult on an IP private network behind a DID trunk. Re-routing IP traffic when the network fails, is a known deficiency of IP networks, normally requiring an expensive duplicated/redundant network. For example, to use a public network as an alternate network, the private network user must know to dial out to a public number rather than a private extension number to reach an in-network destination. When the call connects, the party being called receives the call unaware that the incoming call is a private network call because it looks like a normal public call. Also, none of the private network features are passed along to the called party when the call is alternately routed over the public network. Only users with a public DID number can receive alternate routed PSTN calls addressed or directed to them. Because of the expense for each DID number, many private network users do not get their own public number. Instead, they have a private extension number and incoming public trunks can only be transferred to them or, they may be in a hunt group.

In addition, IP Private network users must be aware of which network (private or public) they are using in order to send and receive calls correctly. Otherwise, alternately routed calls must be initiated by network administration. Network addressing may differ for these alternately routed calls, and normal network features may be different or non-existent. As a result the called party experiences operational differences, e.g., loss of caller identifiability. Finally, VoIP private network users that do not have a DID number would be unreachable during periods of extreme QoS degradation or network failures. So, it is important to provide high quality calls overs an IP private network.

Thus, there is a need for private networks and methods that seamlessly switch VoIP calls to alternate networks as needed when communications degrade.

SUMMARY OF THE INVENTION

It is a purpose of the invention to provide high quality calls between users in a VoIP private network even when quality of service degrades.

The present invention is a system and method of Voice over Internet Protocol (VoIP) private network call rerouting or switching that may be substantially transparent to both the caller and the called party. IP private network calls (e.g., VoIP private network) are automatically switched over a Public Services Telephone Network (PSTN) such as an Integrated Services Digital Network (ISDN) as the need arises. Alternate routing may occur because of, for example, network congestion, network outages, or detected poor Quality of Service (QoS) in the private network. A preferred embodiment system uses existing customer ISDN trunks and one Direct Inward Dial (DID) number, unlisted, that serves all users at a location (i.e., at a network entity with gateway). Calling Party Number Information Elements (IE) correlate calls switched to the PSTN to enable call associated information, such as a private calling user number, name, classmarks, Dialed Number Identification Services (DNIS), user group to be identified accurately. Thus, VoIP calls made between IP private network users appear as intranetwork calls regardless of whether they are actually intranetwork calls or alternately routed over the PSTN.

DETAILED DESCRIPTION OF PREFERRED EMBODIMENTS

The present invention is a system and method of Voice over Internet Protocol (VoIP) private network call rerouting or switching that is transparent to both the caller and the called party. IP private network calls (e.g., VoIP private network) are automatically switched over a Public Services Telephone Network (PSTN) such as an Integrated Services Digital Network (ISDN) as the need arises. Alternate routing may occur because of, for example, network congestion, network outages, or detected poor Quality of Service (QoS) in the private network. The preferred embodiment system uses existing customer ISDN trunks and one dedicated Direct Inward Dial (DID) number, unlisted, that serves all users at a location. Calling Party Number Information Elements (IE) correlate calls switched to the PSTN with call associated information, such as a private calling user number, name, classmarks, Dialed Number Identification Services (DNIS), user group. Thus, VoIP calls made between IP private network users appear as intranetwork calls regardless of whether they are actually intranetwork calls or alternately routed over the PSTN.

Figure 1:
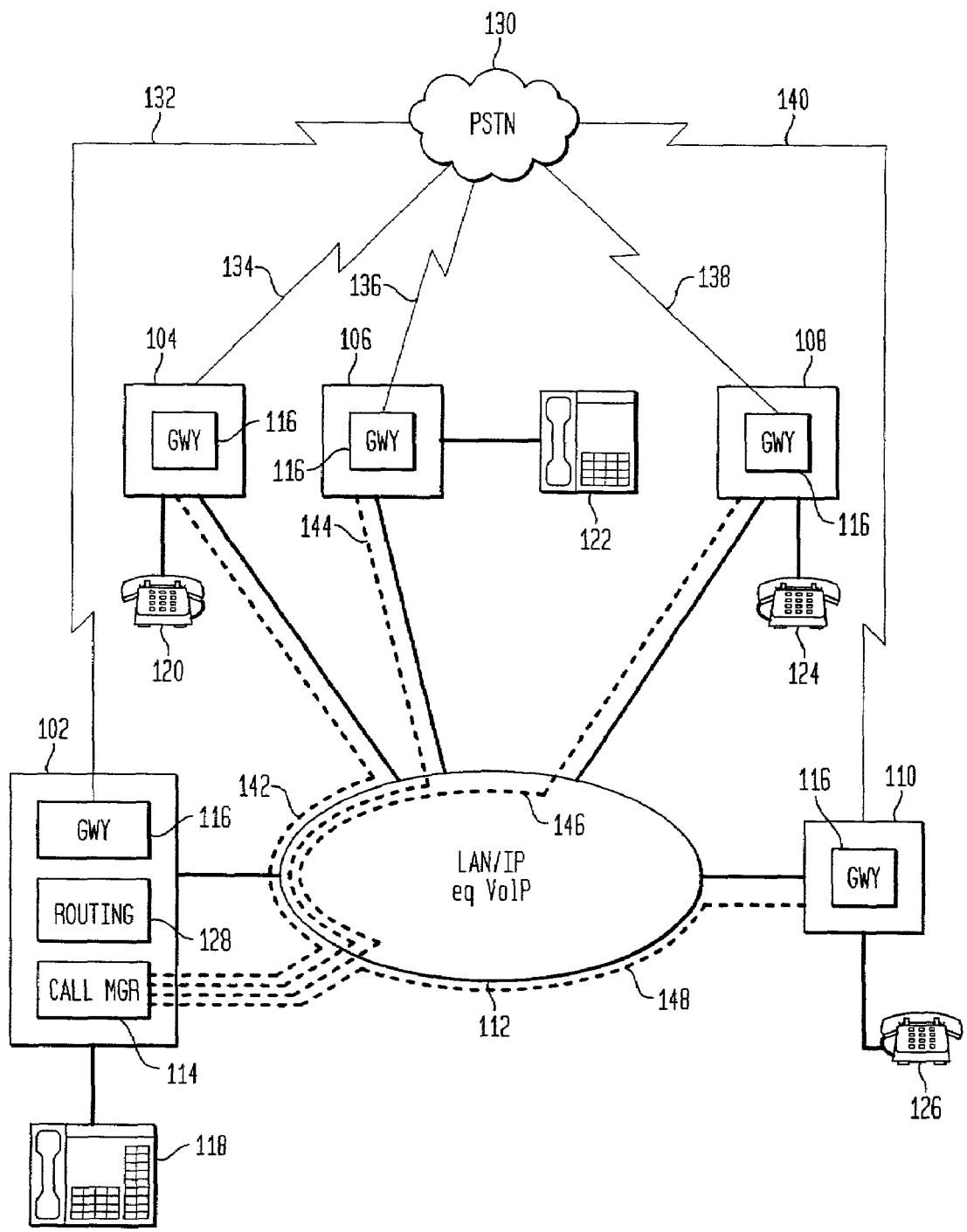
FIG. 1 shows a preferred embodiment voice over internet protocol (VoIP) private network according to the present invention.

FIG. 1 shows a preferred embodiment voice over internet protocol (VoIP) private network 100 according to the present invention. Multiple distributed systems (DS) 102, 104, 106, 108 and 110 are connected to and communicating together, exchanging voice packets over a local area network (LAN) or a wide area network (WAN) 112. A call manager 114 located in distributed system 102 manages VoIP calls between the distributed systems 102, 104, 106, 108, 110. Each distributed system 102, 104, 106, 108 includes a gateway 116 and voice communication facility 118, 120, 122, 124 and 126, respectively. In particular, gateway 116 may be a time division multiplexed (TDM) packet based conversion gateway. Distributed system 102 includes routing control 128 which routes voice messages from a public service telephone network (PSTN) 130 through gateway 116 via call manager 114 as well as calls between distributed network systems over the LAN 112. Further, each distributed system 102, 104, 106, 108, 110 is in communication with a public service telephone network 130 over a respective voice telephone line 132, 134, 136, 138, 140, preferably an ISDN trunk. Accordingly, signaling channels 142, 144, 146 and 148 are shown between the call manager 114 and distributed network 102 and each of distributed networks 104, 106, 108, 110, respectively. In addition to managing a signaling channel 142, 144, 146, 148 to each distributed system, call manager 114 provides call processing/device handling and ensures dependability for all distributed network calls.

TABLE 1

| Index | DS | Unlisted DID # |
|---|---|---|
| 1 | C.Mgr. (102) | 561-923-1000 |
| 2 | DS1 (104) | 408-492-1000 |
| 3 | DS2 (106) | 612-487-1000 |
| 4 | DS3 (108) | 334-543-1000 |
| 5 | DS4 (110) | 954-220-1000 |
| etc. | | |

Table 1 shows an example of an alternate routing DID number table located in the call manager 114. The alternate routing DID number table contains unlisted DID numbers for the distributed systems 102, 104, 106, 108, 110 of FIG. 1. The first entry is for the distributed system 102 and includes a DID number for call manager 114 as indicated by the C.Mgr. entry in the DS column. The second entry, index number two, corresponds to distributed system 104. The third entry, 3, corresponds to distributed network 106. The forth entry, 4, corresponds to distributed network 108. The fifth entry, 5, corresponds to a distributed network 110.

TABLE 2

| Ext # | Public # | DS idx | Name | Class of Service | etc. |
|---|---|---|---|---|---|
| 24321 | — | 2 | Gary | 1 | |
| 7000 | 561-923-7000 | 1 | Peggy | 999 | |
| 6666 | — | 6 | Nancy | 6 | |
| 1333 | 612-908-1333 | 3 | Dave | 537 | |
| 3333 | — | 3 | Dennis | 333 | |

Table 2 is an example of a subscriber/line table, also located in the call manager 114. As can be seen from Table 2, the second entry, which is for extension 7000, is indexed to correspond to the first entry in the alternate routing DID table, Table 1, which is an entry for distributed network 102. Both the forth entry, which is for extension 1333, and the fifth entry, which is for extension 3333, are indexed to correspond to the third entry in the alternate routing DID number table and, therefore, correspond to distributed network 106 because these two people are located in the same DS.

Figure 2:
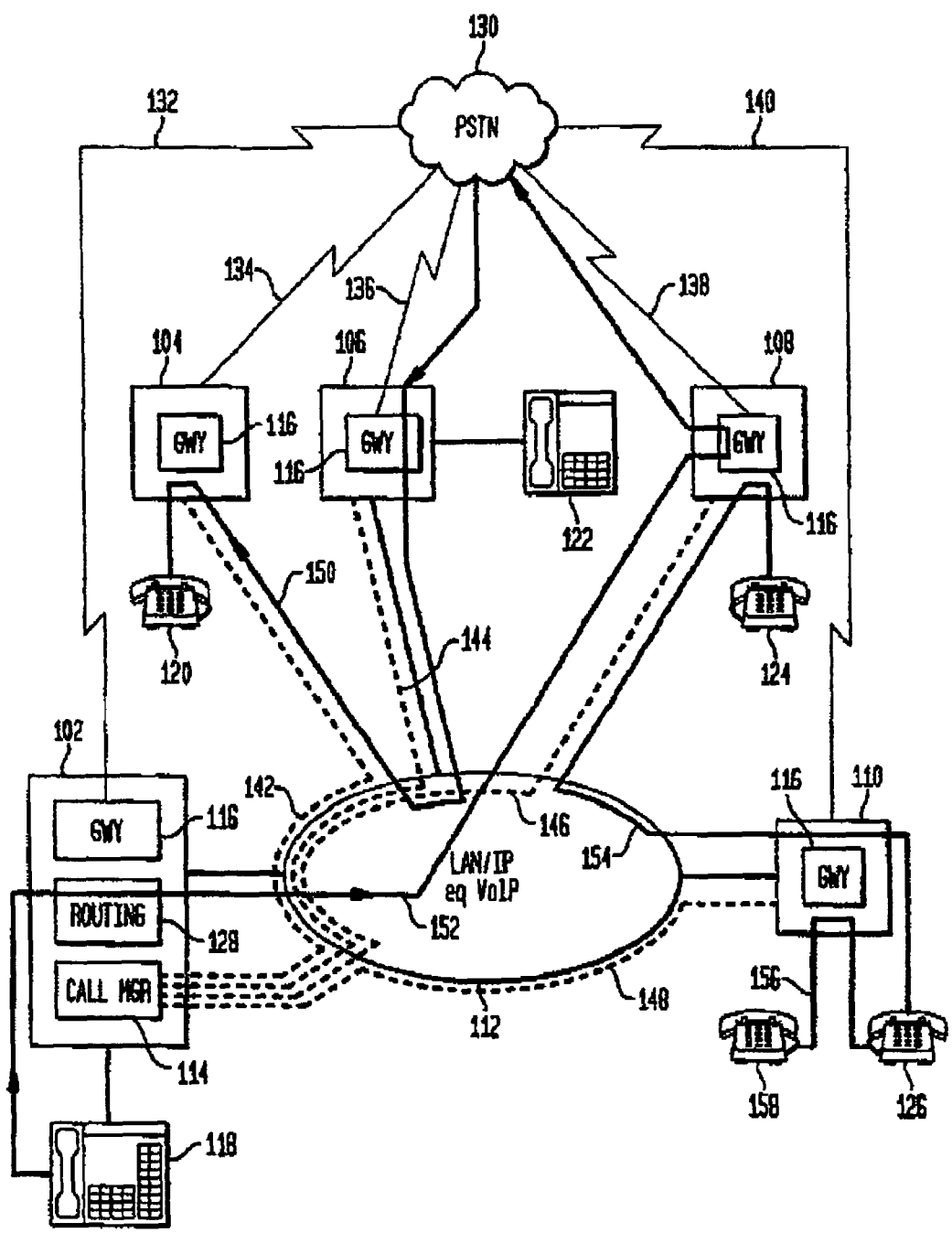
FIG. 2 shows an example of normal call processing of calls over the network.

FIG. 2 shows an example of normal call processing of calls 150, 152, 154 and 156 over the network 100 of FIG. 1. Path 150 represents an incoming call from PSTN 130 to a station on the network. This call 150 originates in the PSTN 130, passes through the gateway 116 in distributed system 106 and, over the LAN 112 to destination distributed network 104 and to a user at IP telephone 120. Outgoing call path 152 originates at IP telephone 118 on distributed network 102 and is routed by a call manager 114 over the LAN 112 to and through distributed network 108 to the PSTN 130. Call path 154 is an inter-network call that originates at non-IP/TDM telephone 126, passes through distributed network 110 gateway 116, over the LAN to distributed network 108 to IP telephone 124. An intra-system (116) call is represented by short path 156 between local TDM telephones 126 and 158. This intra-system call 156 does not leave distributed network 110. It should be noted that although TDM devices are described in this example, this is for example only and any of these devices may be replaced by other appropriate devices such as internet protocol devices. The call manager 114 manages a call routing and call processing of all calls to/from the PSTN 130. The call manager 114 also manages call processing for intra/inter network calls but does not control LAN routing.

Figure 3:
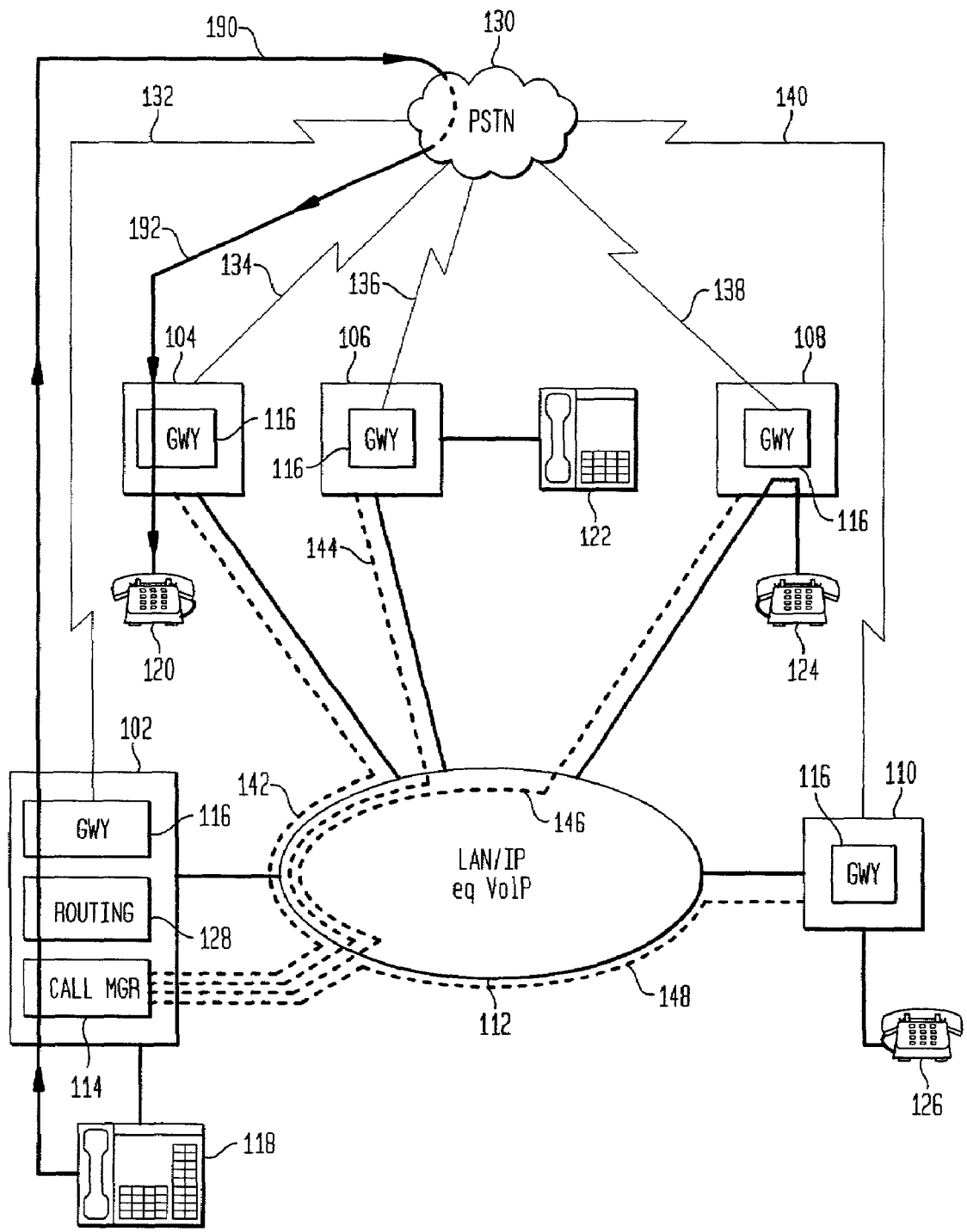
FIG. 3 shows an example of an inter-network call wherein alternate network routing is used when LAN traffic is very heavy and VoIP call quality is unacceptable.

FIG. 3 shows an example of an inter-network call made according to the present invention wherein alternate network routing is used when for example LAN traffic is very heavy and VoIP call quality is unacceptable. So, for example, a party named Peggy calls from extension 7000 at telephone 118 to Gary who is located at telephone 120 at extension 24321. In this example, the call originates at IP telephone 118 and passes through distributed system 102, through gateway 116, over line 132 to PSTN 130 on path 190. The call returns from the PSTN 130 on path 192 through line 134 at an unlisted DID number to distributed system 104 and passed to Gary at telephone 120.

Figure 4:
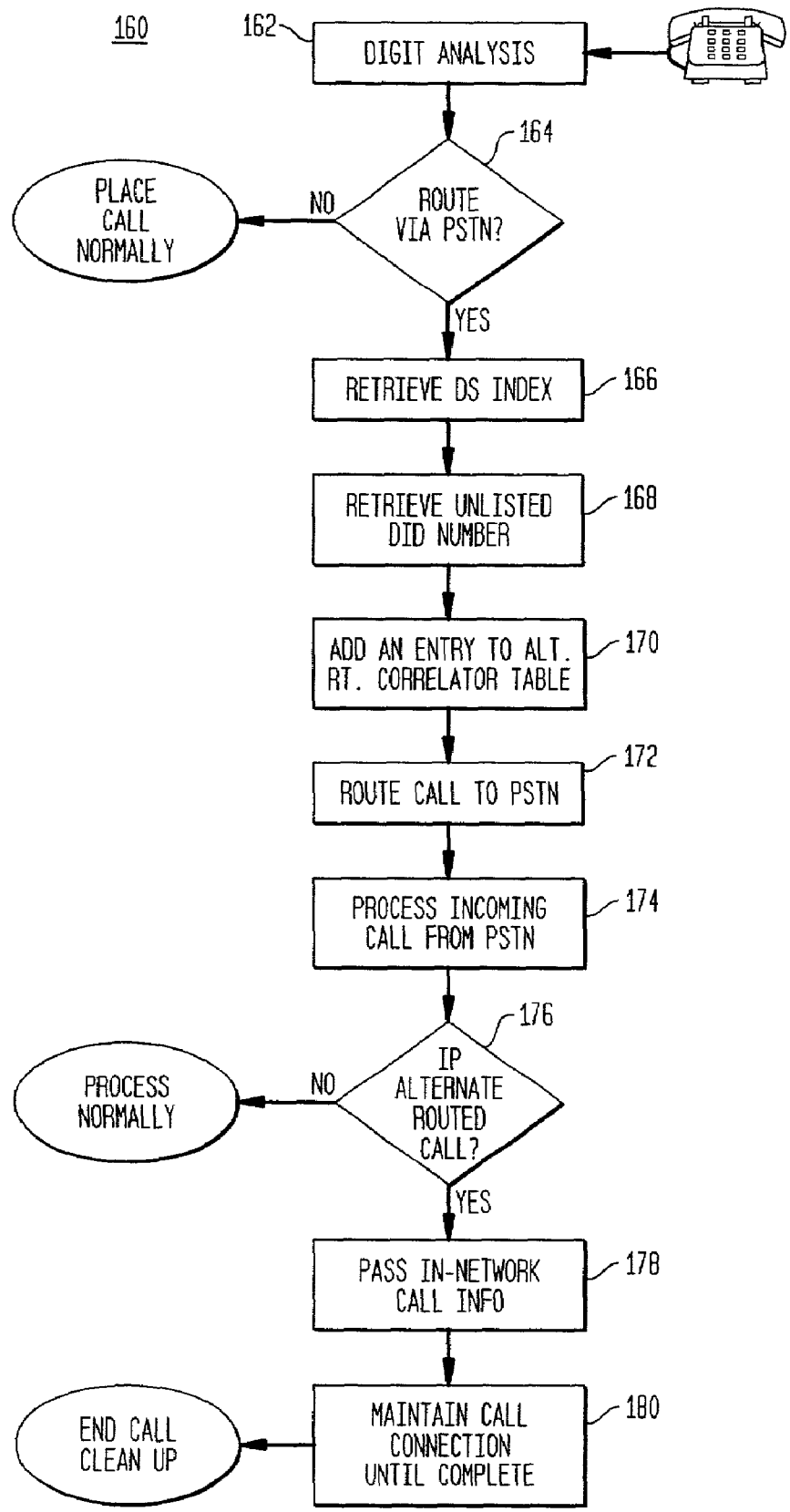
FIG. 4 is an example of a flow chart for alternate routing calls over a PSTN.

FIG. 4 is an example of a flow chart 160 for alternate routing calls over a PSTN. In step 162 the call manager analyzes the dialed number, 24321. In step 164 the call manager determines how to route the call (e.g., network communications have degraded below a selected quality level). If alternate routing is necessary, then, the call manager must respond by providing an alternate route through the PSTN 130. Also, the user may have provided an access code to manually request placing the call over PSTN. In step 166, the call manager looks up the destination that corresponds to number 24321 in the subscriber line/table (e.g., Table 2) and retrieves the distributed system index, 2. Then, in step 168 the call manager uses the distributed system index, 2 in this example, to locate and retrieve the corresponding unlisted DID number, 408-492-1000 from Table 1. Next, the call manager finds the entry corresponding to unlisted number 408-492-1000 in the routing table and retrieves a route number, outgoing route 190 in this example.

TABLE 3

| Correlator # | Called # | Calling # |
| --- | --- | --- |
| 1002000001 | 24321 | 7000 |
| 1002000033 | 55321 | 1333 |
| 1002000055 | 25000 | 777-300-4000 |

Next, the call manager assigns an unused ten digit correlator number to the call and in step 170 stores the correlator number in the alternate route correlator table with an associated called number and calling number. Table 3 is an example of an alternate route correlator table used in step 170, which is a dynamic table that is changed/updated every time a new call is routed externally. In step 172, the call is routed over route 190 which, preferably, is an ISDN trunk. Call information is sent, including both the called number, e.g., 408-492-1000, and the calling number which is represented by the 10 digit correlator for that call, in this example 1002000001. Next, the PSTN 130 delivers the call to the destination distributed system, incoming trunk 192 to DS104 in this example. Also, attached call correlation information is provided with the call (i.e., calling number IE) to the destination distributed system. The receiving distributed system 104 signals the call manager 114 of an incoming call and passes the associated call information to the call manager over the IP or PSTN signaling channel. In step 174, the call manager 114 processes the incoming trunk call from the PSTN 130, e.g., prefix logic, translation, dial plan.

TABLE 4

| Dialed Digits | Digit Analysis Result |
| --- | --- |
| 1333 | station |
| 24321 | station |
| 25000 | Hunt Group |
| 3333 | station |
| 3345431000 | IP alt. rt. call |
| 4084921000 | IP alt. rt. call |
| 5619231000 | IP alt. rt. call |
| 5619237000 | station |
| 6124871000 | IP alt. rt. call |
| 6129081333 | station |
| 6666 | station |
| 7000 | station |
| 9542201000 | IP alt. non-ISDN routed call |

Using a Dial Plan/Digit Analysis Table such as Table 4, the call manager 114 performs a digit analysis on the called number, 408-492-1000 in this example. So, in step 176 for this call analysis result is an "IP alternate routed call" indicating that alternate routed call processing is required. In response, the call manager from the alternate route correlator table, i.e., 1002000001 from Table 3 this example. The call manager 114 informs the destination distributed system 104 that the call is directed to telephone extension 24321 and, that the calling number is extension 7000. In step 178, the call manager 114 passes any additional call information, such as the calling party name, COS, etc. The destination 104 receives call packets from the call manager 114 and terminates the call at extension 24321, providing an internal ring, displaying a calling party number (7000 in this example) along with the name associated with the calling number, Peggy in this example.

Thereafter, in step 180 the destination distributed system 102 provides normal IP signaling associated with the call (e.g., call transfer). Upon disconnect, the distributed system 102 signals the call manager 114 that call 24321 has disconnected. The call manager 114 receives both the disconnect signal from the distributed system 102 and an internal signal from the originating station 118 that the call has disconnected. Then, the call manager 114 removes the corresponding entry for the call between station 7000 and extension 24321 from the alternate routing table and releases the correlation number.

It should be noted that TIN uses, preferably, four tables for each call. First, the alternate routing DID table, e.g., Table 1, includes an entry for each distributed system in the network. An alternate routing correlator table, e.g., Table 3 dynamically matches called numbers and calling numbers. A field is included in the subscriber/line table, e.g., Table 2, for the distributed system index. This field for the distributed system index is implementation dependent and may include operator/hunt group information. Fourth, the existing digit analysis/dial plan table includes an indicator or result that is associated with each unlisted DID number to identify that it is an alternate routed call to be treated as an internal call.

Figure 5:
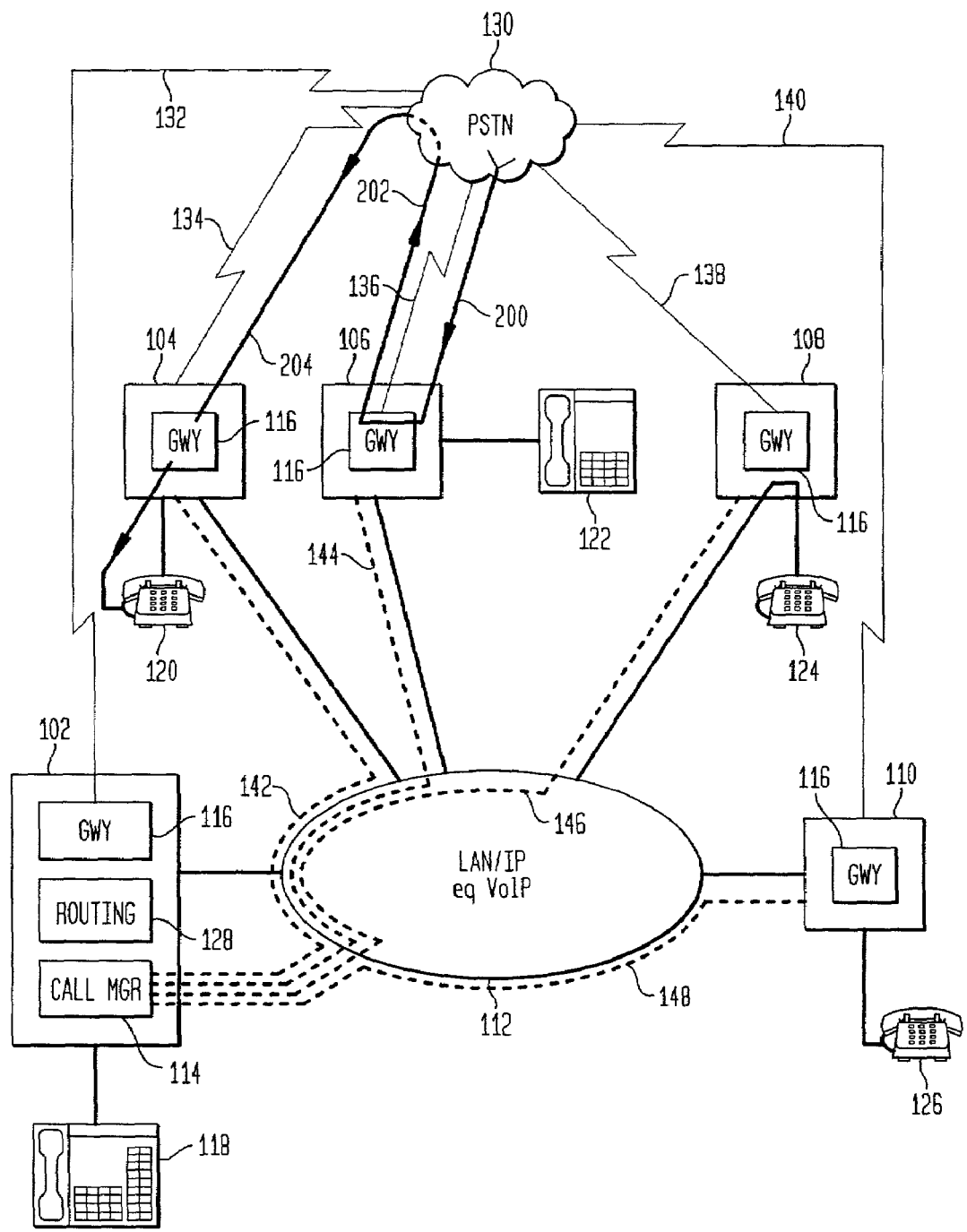
FIG. 5 shows another example of an incoming call that is re-routed over the PSTN.

FIG. 5 shows another example of an incoming call that is re-routed over the PSTN 130. In this example, the call terminates to Gary at telephone 120 originates in the PSTN 130. Thus, the incoming call follows the path 200 to distributed system 106, is routed back out path 202 from distributed system 106 to the PSTN 130 and connection is made to the unlisted DID number of distributed system 104.

The call passes in on path 204 to telephone 120 on distributed system 104. So, the incoming call path 200 is to distributed system 106, normally passes as VoIP over the LAN 112 to distributed system 104 and terminates to an operator hunt group. The initial incoming call 200 to distributed system 106 is placed to local number, 612-492-5000 in this example. This local number translates on the DID system to 25000, which may be extracted using a translation table such as Table 5 below.

TABLE 5

| Number In | Modification | Number Out |
|---|---|---|
| 612-492-5000 | Delete 5 | 25000 |

The call manager 114 may determine that LAN traffic is too heavy or other circumstances have degraded network quality sufficiently that the VoIP call should not proceed over the LAN 112. Then, the call manager 114 performs a digit analysis on extension 25000 to determine that this is a pilot/operator hunt group. The call manager 114 performs a look up in the hunt group table (e.g., Table 6 below) for extension 25000 to retrieve the first station in the hunt group, which corresponds to Gary in Table 6. Then, the associated distributed system index, 2 in Table 2, is retrieved from the subscriber/line table.

TABLE 6

| HG# | Stations |
|---|---|
| 1 | . |
|  | . |
|  | . |
| 5 | 25000 |
|  | 24321 |
|  | 24322 |
|  | 24323 |
|  | 24324 |

So, the call manager 114 searches the alternate routing DID number table to find the entry corresponding to distributed system index 2 and retrieves the unlisted number, 408-492-1000 in this example. Then, the call manager 114 finds the entry for the unlisted number in the routing table and retrieves the alternate outgoing route 202. The call manager 114 assigns an unused ten digit correlator number to the call which it stores in the alternate route correlator table along with the translated ext #25000 and the calling #777-300-4000.

Accordingly, the call is transmitted on route 202 over the PSTN 130 with the called number and calling number, 408-492-1000 and 1002000055 in this example. The PSTN delivers the call on path 204 to distributed system 104. The receiving distributed system 104 signals the call manager 114 of an incoming call and passes the associated call information to the call manager over the IP or PSTN signaling channel. The call manager 114 processes the called party number, 408-492-1000. The digit analysis result indicates that the call is an "IP alternate routed call." In response, the call manager identifies the calling number, 1002000055 in the alternate route correlator Table 3. The call manager 114 informs the destination distributed system 104 that the call is directed to extension 25000 and passes any additional call information such as calling party number 777-300-4000. Extension 25000 is a hunt group pointing to extension 24321 (Gary) and the call terminates to IP telephone 120.

A single unlisted (unpublished) public network directory number (i.e., a single DID number) per remote server is provided for all alternate routed calls. Each remote server services multiple users, including users not assigned expensive public DID numbers. For each alternately routed call, the single DID number is the outgoing called number, but is not treated as the actual called number. A calling number is assigned to each call and stored locally for subsequent correlation to call associated information. The call is sent over the alternate network, e.g., over the caller's existing public network trunks. If the public network trunks are ISDN, then sending the correlation number (format 10-digit NANP) in the Calling Party Number IE does not violate protocol. However, if the public network trunks are non-ISDN (i.e., analog or T1/E1 emulation) and the incoming call digital analysis result indicates an "IP alternate non-ISDN routed call," then the call is connected to a phantom number at a DTMF receiver, for example. Consequently, the correlator number digits must be outpulsed (DTMF digits) after receiving the call connect. The call manager 114 can continue specially processing the correlation number and, then, route and connect the call correctly. The correlator digits are not echoed to the caller. However, the caller may experience some delay over non-ISDN trunks.

Bearer/payload calls over the preferred embodiment system closely resemble a private network call to the end user, rather than a public network call. So, for example, even when a call is switched over an alternate path, the private number and name (of calling party) is provided for display rather than an uninformative public number and name. The called party dials the private extension number rather than a public number. Thus, each call appears as an internal call to both caller and called party (including dialing) regardless of the call's actual path, rather than being distinguished as an external or an internal call. Calls are automatically interchanged over circuit-switched technology (typically public facilities) as and when the need arises, rather than sending calls by default over IP packet switched technology unless the caller manually reroutes the call at origination, as is required for calls made from prior art private networks during periods of network degradation.

Since a single public network number is assigned to each individual component of the preferred embodiment system, in the event of a primary network connectivity failure, one component (e.g., a shelf) may establish a connection through the public network to another system component. Each media connection is independent of the system signaling channels, which are routed independently. Each alternate pathway may then be used for one or more user originated connection(s) prior to release of the pathway. A separate pathway may be provided (IP or, PSTN, if the LAN has failed) to communicate signaling such as calling and called party information for each new call while the alternate pathway is in use. Caller and calling party ID are subsequently correlated to the appropriate user connection. Calls are properly routed and the calling party ID is properly presented to the called party as an on-network call.

Call associated information is provided for each call by correlating the received Primary Rate Interface (PRI) Calling Party Number to call information that is sent in parallel with the call over the IP signaling channel. Accordingly, a positive identification and correlation matches the originating call, i.e., the outgoing alternate routed call over the public network, with the correct incoming alternate routed call. In this way, a Calling Party Number Information Element (IE) is associated with each call at origination and then processed to identify the call at the receiving end.

Alternatively, when the public network trunks are not ISDN, the correlator digits must be outpulsed after the call is connected as described hereinabove.

Each incoming alternate path number (i.e., an unlisted directory number) produces a unique digit analysis result. The digit analysis result indicates incoming call survivability for correlation and processing as a private network call. Upon receipt, the original calling and called numbers are restored/matched to the call from call related data buffers (e.g., Table 3). Then, the call, matched with the calling and call numbers, is delivered to the appropriate destination. So, correlated and processed calls are delivered to the proper user device (i.e., the intended called party) by the remote server according to the associated call information instead of the delivered Called Party Number.

Thus, according to a preferred embodiment of the present invention, each VoIP call is placed and received as any normal VoIP call regardless of whether conditions may have necessitated diverting the call to an alternate path or the call actually is a normal VoIP call. If the call must be diverted, call identification information is transmitted over an IP signaling channel, coincident with the call and matched to and included with the call at the receiving end. Preferably, the IP signaling channel may either be routed via the IP network (when in operation) or, alternately routed as a data connection over the PSTN.

Accordingly, the present invention provides a mechanism to use a single DID number over an ISDN trunk to each distributed system to selectively route VoIP calls over an alternate path, e.g., a PSTN. Time division multiplexing (TDM) may be used for calls that cannot be routed over the VoIP network. One dedicated unlisted DID number serves all stations/devices in each distributed system, i.e., the PSTN can deliver multiple and spontaneous calls to same DID number. Each call appears to the called/originator and the terminator/receiving party as a private network call and does not appear as a public call. In other words, information passed to both the caller and the receiving party appears as private network information and calls are dialed as a private network call. The Called Party Number IE digits are those of a single DID number (the unlisted DID number) for the destination distributed system, i.e., the system at which the called party resides.

The present invention correlates alternate routed calls egressing to a PSTN to a corresponding call ingressing from the PSTN to the destination distribution system. These calls are made over ISDN trunks and treated as private network calls rather than public network calls. This is accomplished using existing carrier basic call ISDN protocol without violating the protocol which would cause the call to be rejected. The calling party IE includes a Network Plan ID (NPI). The NPI is an ISDN E.164 and the number format is a ten digital NANP number. The number type is a national number. The calling party number IE provides correlation between by the outgoing alternate routed call and an incoming call. The correlator number allows a call to be associated with a correct destination, i.e., calling party. Further, unlimited private user data may be associated with any particular connection. Optionally, a calling party number presentation may be restricted.

Advantageously, preferred embodiment IP private network VoIP calls are automatically and seamlessly switched to an inexpensive, reliable, transparent fail-safe alternate network whenever conditions on the IP private network become unsuitable or unavailable for VoIP. Accordingly, the present invention provides a very inexpensive VoIP call survivability (e.g., during network outages) solution for an enterprise IP private network. Users may continue to make calls unaware of network degradation or outages. So, users are not forced to dial public numbers in order to make a call, i.e., when the private network is unavailable, but place calls normally undisturbed by network outages. The alternate network may be a public or private network. Alternate routing over public ISDN facilities is automatic and transparent to the end user and users are not forced to manually initiate alternate routing, dial differently, or change call interface in any way. Thus, the present invention compensates network outages transparently for the end users.

While the invention has been described in terms of preferred embodiments, those skilled in the art will recognize that the invention can be practiced with modification within the spirit and scope of the appended claims.

What is claimed is:

1. A method for managing packet communications over a network of distributed systems, each said distributed system being connected to a public communications network through at least one common contact point, each said common contact point being assigned a private direct inward dial (DID) number, communications from said public communications network being directable to users on each of said distributed systems through a selected said common contact point, said method comprising the steps of:
   a) receiving a communications packet at first distributed system, said communications packet being directed to a user of a connected second distributed system;
   b) checking network traffic to determine if said communications packet may be received over said network by said user at a selected quality level; and
   c) routing communications through the public communications network to said connected second distributed system in response to a determination that packets cannot be passed over said network at said selected quality level, routine said communications comprising the steps of:
   i) retrieving from a subscriber/line table a distributed system index corresponding to said second distributed system,
   ii) identifying said DID number for said second system in response to said distributed system index,
   iii) assigning an alternate route to said packet, and
   iv) providing said packet and packet related information to said common contact point at said DID number for said second distributed system.

2. A method as in claim 1, wherein said network comprises a voice over internet protocol (VoIP) private network and routed said communications is a call to said user.

3. A method as in claim 2, further comprising the steps of:
   d) querying each incoming call to connected distributed systems to identify whether said incoming call is an IP alternate routed call;
   e) matching any identified alternate routed call with internal call information; and
   f) passing said incoming packet as an in-network call to said user.

4. A method as in claim 3, wherein identifying whether an incoming packet is an IP alternate routed call comprises performing a digit analysis on a called number associated with the incoming packet, whenever said digit analysis indicates that incoming call originates from a private DID number, said incoming packet is identified as an alternate routed call.

5. A method as in claim 3, wherein the step e) of matching the identified alternate routed call comprises identifying a calling number from an alternate route call correlator table.

6. A method as in claim 3, wherein the step f) of passing said incoming packet to said user as an in-network call comprises:
- providing an internal ring;
- displaying a calling party number corresponding to an original user placing said call; and
- displaying a user name of a calling party.

7. A method as in claim 6, wherein said in-network call is internal to said network originating from a user at said first distributed system to said user at said second distributed system.

8. A method as in claim 6, wherein said in-network call is an incoming call from a caller on said public communications network to said user at said second distributed system.

9. A method as in claim 2, wherein each said DID number is on an ISDN trunk.

10. A private communications network providing communications between a plurality of network users and to a public communications network, private communications network users connecting to said public communications network over said private communications network, said private communications network comprising:
- a plurality of distributed systems connected together and in communication with each other, users at each of said connected distributed systems selectively in communication with each other;
- an identified common contact point at each distributed system, said common contact point being assigned a dedicated direct inward dial (DID) number at a public services telephone network (PSTN) trunk, each distributed system connected to the PSTN through said common contact point, each said distributed system communicating with other ones of said plurality of distributed systems through said common contact point over said PSTN; and
- a call manager in at least one of said plurality of distributed systems, said call manager including an alternate routing DID number table, an alternate route correlator table, a subscriber/line table and a digit analysis/dial plan table, and managing communications between users at different connected said distributed systems, said call manager selectively diverting calls between users at different ones of said plurality of distributed systems over said PSTN.

11. A private communications network as in claim 10, wherein said PSTN trunk is an ISDN trunk.

12. A private communications network as in claim 11, wherein each of said plurality of distributed systems including a gateway, and said gateway is a time division multiplexed (TDM) packet based conversion gateway.

13. A private communication network as in claim 10 wherein the alternate routing DID table assigns a single index to all users at each DID number for each distributed system.

14. A private communication network as in claim 10, wherein the subscriber/line table includes an extension field indicating each corresponding user's extension, a public number field indicating whether said each corresponding user has a public number and a DS index field corresponding to an index in said alternate routing DID table.

15. A private communication network as in claim 10, wherein the alternate route correlator table is a dynamically changing table wherein said call manager adds table entries to said alternate route correlator table in response to creation of a new alternate routed call to a user, each added entry including a correlator number field, a called number field and calling number field.

16. A private communication network as in claim 10, wherein said private communications network is a voice over internet protocol (VoIP) private network and said dedicated DID number is a single dedicated DID number at each distributed system.

* * * * *